US012614712B2

(12) United States Patent
Klein et al.

(10) Patent No.: US 12,614,712 B2
(45) Date of Patent: Apr. 28, 2026

(54) METHOD FOR THE PRODUCTION OF AN ELECTRODE FOR A BATTERY CELL OF AN ELECTRICAL ENERGY STORAGE DEVICE, ELECTRODE AND GENERATOR

(71) Applicant: Mercedes-Benz Group AG, Stuttgart (DE)

(72) Inventors: Malte Henrik Klein, Stuttgart (DE); Hendrik Dubbe, Stuttgart (DE)

(73) Assignee: Mercedes-Benz Group AG, Stuttgart (DE)

( * ) Notice: Subject to any disclaimer, the term of this patent is extended or adjusted under 35 U.S.C. 154(b) by 0 days.

(21) Appl. No.: 18/840,426

(22) PCT Filed: Nov. 9, 2023

(86) PCT No.: PCT/EP2023/081303
§ 371 (c)(1),
(2) Date: Aug. 21, 2024

(87) PCT Pub. No.: WO2024/115071
PCT Pub. Date: Jun. 6, 2024

(65) Prior Publication Data
US 2025/0286037 A1 Sep. 11, 2025

(30) Foreign Application Priority Data

Dec. 1, 2022 (DE) ..................... 10 2022 004 498.6

(51) Int. Cl.
*H01M 4/04* (2006.01)
*H01M 4/74* (2006.01)

(52) U.S. Cl.
CPC ....... *H01M 4/0419* (2013.01); *H01M 4/0404* (2013.01); *H01M 4/747* (2013.01)

(58) Field of Classification Search
CPC .. H01M 4/0404; H01M 4/043; H01M 4/0419; H01M 10/0404; H01M 10/043;
(Continued)

(56) References Cited

U.S. PATENT DOCUMENTS 10,547,044 B2 1/2020 Wang et al.
2013/0017340 A1* 1/2013 Brown .................. H01M 4/131
427/458

FOREIGN PATENT DOCUMENTS

CN 207086395 * 3/2018
DE 10 2019 118 110 A1 1/2021
(Continued)

OTHER PUBLICATIONS

International Search Report (PCT/ISA/210) issued in PCT Application No. PCT/EP2023/081303 dated Feb. 22, 2024 (3 pages).
(Continued)

*Primary Examiner* — Tabassom Tadayyon Eslami
(74) *Attorney, Agent, or Firm* — Crowell & Moring LLP

(57) ABSTRACT

A method for production of an electrode for a battery cell of an electrical energy storage device by a generator includes spraying an electrode powder onto a metallic substrate web by a spraying device of the generator and compressing the electrode powder onto the metallic substrate web by a stamping device of the generator. Before the spraying, the electrode powder is electrically charged by corona or tribological charging.

5 Claims, 1 Drawing Sheet

(58) Field of Classification Search
CPC . H01M 10/139; H01J 37/32073; B05B 14/00;
B05B 14/10; B05B 14/20; B05B 14/30;
C23C 14/56; B05C 19/007; Y02P 10/20
USPC ........................................ 29/623.5; 264/37.1
See application file for complete search history.

(56) References Cited

FOREIGN PATENT DOCUMENTS

| | | | |
|---|---|---|---|
| EP | 2 030 697 A2 | | 3/2009 |
| EP | 3213361 | * | 10/2010 |
| EP | 2 426 760 A1 | | 3/2012 |
| EP | 2 988 944 B1 | | 3/2016 |
| EP | 3 213 361 B1 | | 9/2017 |
| EP | 2988944 | * | 7/2020 |
| WO | WO 2013/009457 A2 | | 1/2013 |

OTHER PUBLICATIONS

German-language German Office Action issued in German Application No. 10 2022 004 498.6 dated Aug. 10, 2023 (6 pages).

* cited by examiner

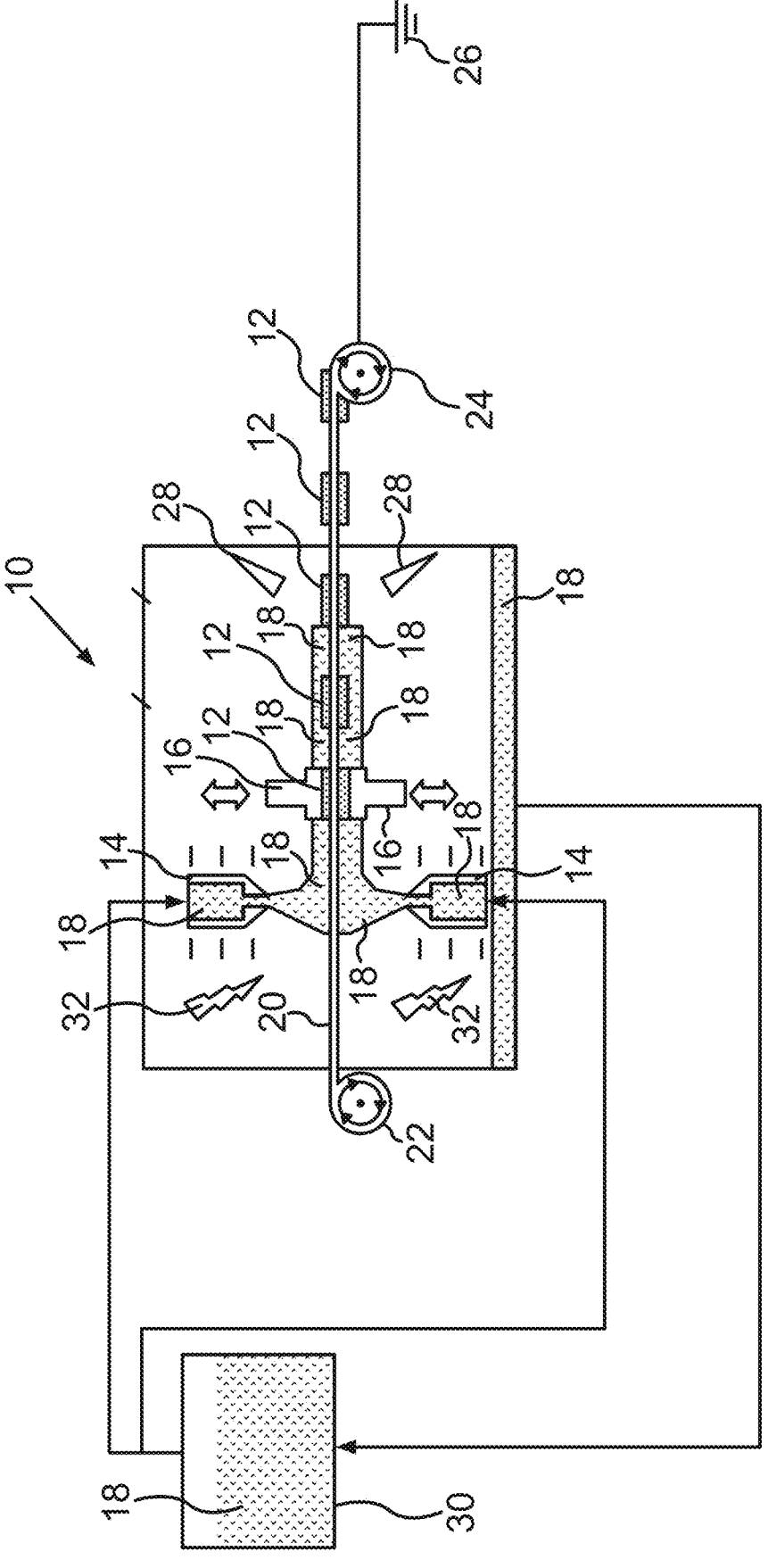

METHOD FOR THE PRODUCTION OF AN ELECTRODE FOR A BATTERY CELL OF AN ELECTRICAL ENERGY STORAGE DEVICE, ELECTRODE AND GENERATOR

BACKGROUND AND SUMMARY OF THE INVENTION

The invention relates to a method for the production of an electrode for a battery cell of an electrical energy storage device by means of a generator. The invention further relates to an electrode for a battery cell and to a generator for producing an electrode for a battery cell.

Coating processes for battery cell electrodes are already known from the prior art. Here, a so-called slurry is mixed, which corresponds in particular to an active material, binder, additive and solvent. The slurry is then applied to a metallic substrate, and the wet film is then dried within a drying section, which is in particular designed as a continuous furnace. The solvent, for example water, is completely evaporated in the drying process. This process uses a lot of energy.

U.S. Pat. No. 10,547,044 B2 describes a method for the production of dry electrodes for low-cost batteries via a dry mixing and shaping method. A thermal activation makes the electrodes that have been produced dry comparable with conventional electrodes cast from sludge/slurry. The dry electrode mixture results from a combination of several kinds of component particles, including at least one active charging material and a binding means, and typically a conductive material such as carbon. The method heats the separated material to a moderate temperature to activate the binding means, so that the mixture adheres to the substrate, and compresses the separated mixture to a thickness to obtain a sufficient electrical power of the compressed, separated mixture as a charging material in a battery.

EP 3 213 361 relates to a method of forming a particle film on a substrate. A series of corona canons, which are arranged offset to optimize the evenness of the layer thickness, is preferably aligned on both sides of a slow-moving earthed substrate. The substrate is preferably slightly heated to encourage the flow of the binding means, and is fed through a series of hot rollers, which further encourage melting and improve the evenness of the film. The film is collected on a roller, or can be combined in-situ and rolled into a single-cell battery. The invention relates to products that are produced by the method according to the invention, in particular to batteries.

US 2013 017 340 A1 relates to a method and to a device for producing lithium-ion batteries and individual battery cell components, and in particular to a system and to a method for producing such batteries and individual battery cell components using separating processes, which form three-dimensional porous structures. One method comprises texturing a conductive substrate by calendering the conductive substrate between opposite wireframes, forming a first layer of cathodically active material having a first porosity on the surface of the textured conductive substrate and forming a second layer of cathodically active material having a second porosity on the first layer, wherein the second porosity is greater than the first porosity.

The object of the present invention is to create a method, an electrode and a generator by means of which an electrode can be produced in an improved manner.

One aspect of the invention relates to a method for the production of an electrode for a battery cell of an electrical energy storage device by means of a generator. An electrode powder is sprayed onto a metallic substrate web by means of a spraying device of the generator and the electrode powder is compressed onto the substrate web by means of a stamping device of the generator.

In particular, a drastic reduction of the use of material in comparison with wet coating, and also in comparison with continuous web coating, can thus be implemented, because unused active material can in particular be directly fed back into the process. The use of energy can further be clearly reduced, because, in particular, it is not necessary for a solvent to evaporate.

In particular, the goal of the suggested method is thus to carry out the coating in a dry state. For this purpose, the electrode powder, which can also be described as an active material, is mixed with binders and additives for cathodes and anodes in the dry state. The powder then runs through a roll-to-roll process, wherein the mixed powder is sprayed onto one or both sides, i.e., it is first fluidized in a gas flow, and for example exits via a nozzle near the substrate film. The powder itself is electrically charged either by means of corona or tribological charging, in particular so-called friction charging. Meanwhile, the metallic substrate is earthed. The powder is first layered onto the material in a disordered manner and without the required sharp contour edges. Directly afterwards, the powder material is compressed with the substrate film by means of one or both sides of the stamp. On the other hand, the powder is only bound to the film by electrostatic forces at the uncompressed points. At the end of the process, the uncompressed powder is then removed, for example by means of compressed air, and can then be fed back into the process. In this manner, the recovered powder can be re-used, which, in addition to energy saving, in particular in the case of the drying process, leads to a reduction in waste or offcuts, because only the compressed active material remains on the substrate film.

It is further provided that the electrode powder is electrically charged before spraying by means of corona or tribological charging. In particular, the electrode powder can thus be applied to the substrate web, and can be kept on the substrate web due to electrostatic forces, until the actual compression process takes place. However, the electrostatic forces are in turn so low that the uncompressed electrode particles can in turn be removed by means of an air jet, for example after the compression process.

According to an advantageous embodiment, the electrode powder is sprayed onto both sides of the metallic substrate web. In particular, the metallic substrate web can run on corresponding rollers, and the electrode powder can be sprayed onto the metallic substrate web both from above and from below. The electrode powder can in particular also be reliably held on the underside of the substrate web, in particular due to corresponding electrostatic forces. It is thus made possible for the electrode to be produced in a simple manner.

It is further advantageous if the uncompressed electrode powder is removed from the metallic substrate web by means of an air jet after compression. In particular, the roller shutter electrode powder can be used again after removal, in particular for a further spraying process. It is thus made possible to use the electrode powder again, which can be used to save material for the production process of a plurality of electrodes.

It is also advantageous if a cathode material or an anode material is mixed dry with a binder and at least one additive to form an electrode powder. In particular, this takes place before the spraying process. The electrode powder can thus be produced dry and without solvents.

It has further proved advantageous if the metallic substrate web is earthed. In particular, a corresponding adhesive force can thus be generated between the electrode powder and the metallic substrate web, whereby the electrode powder is held on the metallic substrate web without being able to carry out a direct compression process.

It has further proved advantageous that the electrode powder is fluidized before the spraying process. In particular, it can thus be provided that the electrode powder runs through a roll-to-roll process, wherein the mixed powder is sprayed onto one or both sides, i.e., it is first fluidized in a gas flow, and for example then exits via a corresponding nozzle near the substrate film. The powder can then be electrically charged in turn by means of corona or tribological charging.

A further aspect of the invention relates to an electrode for a battery cell, wherein the electrode is produced with a method according to the preceding aspect.

Furthermore, the invention also relates to a generator for producing an electrode for a battery cell of an electrical energy storage device, having at least one spraying device and a stamping device, wherein the generator is designed to produce an electrode according to the preceding aspect with a method according to the preceding aspect. In particular, the electrode is produced with the generator.

Advantageous embodiments of the method are to be seen as advantageous embodiments of the electrode and of the generator.

Further advantages, features and details of the invention result from the following description of a preferred exemplary embodiment and with reference to the drawing. The features and combinations of features specified previously in the description and the features and combinations of features specified in the following description of the FIGURE and/or shown in the single FIGURE alone can be used not only in the respectively specified combinations, but also in other combinations or in isolation without leaving the scope of the invention.

BRIEF DESCRIPTION OF THE DRAWING

The single FIGURE shows a schematic side view of an embodiment of a generator.

DETAILED DESCRIPTION OF THE DRAWING

Identical or functionally identical elements are provided with the same reference signs in the FIGURE.

The FIGURE shows a schematic side view of an embodiment of a generator 10. The generator 10 is designed to produce an electrode 12 for a battery cell (not depicted) of an electrical energy storage device (not depicted). The generator 10 has at least one spraying device 14 and a stamping device 16.

In the method according to the invention for producing an electrode 12, it is provided that an electrode powder 18 is sprayed onto a metallic substrate web 20 by means of the spraying device 14. The electrode powder 18 is then compressed on the substrate web 20 by means of the stamping device 16.

In the present exemplary embodiment, it is in particular shown that the substrate web 20 is unrolled or rolled up on two rollers 22, 24. In particular, the substrate web 20 is rolled up on the first roller 22, and the substrate web is unrolled with the electrode 12 or the electrodes 12 on the second roller 24. It is further shown that in the present exemplary embodiment, the second roller 24 is earthed via an earthing 26.

The FIGURE further shows that the electrode powder 18 is in particular sprayed onto both sides of the metallic substrate web 20. It can further in particular be provided that the uncompressed electrode powder is removed from the metallic substrate web 20 by means of an air jet 28 after compression. In particular, the uncompressed electrode powder 18 can be re-used for a further spraying process. For this purpose, it can for example be provided that a reservoir 30 is provided, in which the electrode powder 18 is introduced or returned, in order then to be used for the spraying process in turn.

The electrode powder 18 is in particular mixed dry from a cathode material or an anode material with binders and an additive. It can further be provided that the electrode powder 18 is electrically charged before spraying by means of corona or tribological charging 32. The electrode powder 18 is further fluidized before spraying.

In particular, the invention thus provides that, after the electrode powder 18 is mixed together dry, the electrode powder goes through a roll-to-roll process in turn, wherein the mixed electrode powder 18 is sprayed onto one or both sides, i.e., it is then fluidized via a gas flow, and for example exits via a nozzle near the metallic substrate web 20. The electrode powder 18 itself is electrically charged either by means of corona or tribological charging. Meanwhile, the metallic substrate film is earthed. The electrode powder 18 is first layered onto the material in a disordered manner and without the required sharp contour edges. Directly afterwards, the electrode powder 18 is compressed with the substrate film by means of one or both sides of the stamp. On the other hand, the electrode powder 18 is only bound to the substrate film by electrostatic forces at the uncompressed points. At the end of the process, the uncompressed electrode powder 18 is then removed, for example by means of compressed air, and can then be fed back into the process. In this manner, the recovered electrode powder 18 can be re-used, which, in addition to energy saving, leads to a reduction in waste or offcuts, because only the compressed active material remains on the substrate film.

The invention claimed is:

1. A method for production of an electrode (12) for a battery cell of an electrical energy storage device by a generator (10), comprising the steps of:

spraying an electrode powder (18) received from a reservoir (30) onto a metallic substrate web (20) by a spraying device (14) of the generator (10);

compressing the electrode powder (18) onto the metallic substrate web (20) by a stamping device (16) of the generator (10);

before the spraying, electrically charging the electrode powder (18) by corona or tribological charging;

removing uncompressed electrode powder (18) from the metallic substrate web (20) after the compressing by an air jet (28); and feeding the uncompressed electrode powder (18) after the removing into the reservoir (30).

2. The method according to claim 1, wherein the electrode powder (18) is sprayed onto both sides of the metallic substrate web (20).

3. The method according to claim 1, wherein a cathode material or an anode material is mixed dry with a binder and at least one additive to form the electrode powder (18).

4. The method according to claim 1, wherein the metallic substrate web (20) is earthed.

5. The method according to claim 1, wherein the electrode powder (18) is fluidized before the spraying.

\*  \*  \*  \*  \*